(12) United States Patent
Choi (10) Patent No.: US 9,786,434 B2
(45) Date of Patent: Oct. 10, 2017

(54) MULTILAYER CERAMIC ELECTRONIC COMPONENT AND PRINTED CIRCUIT BOARD HAVING THE SAME

(71) Applicant: SAMSUNG ELECTRO-MECHANICS CO., LTD., Suwon-Si, Gyeonggi-Do (KR)

(72) Inventor: Young Don Choi, Suwon-Si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 425 days.

(21) Appl. No.: 14/475,185

(22) Filed: Sep. 2, 2014

(65) Prior Publication Data

US 2015/0109718 A1 Apr. 23, 2015

(30) Foreign Application Priority Data

Oct. 22, 2013 (KR) ........................ 10-2013-0126138
May 9, 2014 (KR) ........................ 10-2014-0055776

(51) Int. Cl.
*H01G 4/228* (2006.01)
*H01G 4/06* (2006.01)
(Continued)

(52) U.S. Cl.
CPC ................ *H01G 4/12* (2013.01); *H01G 2/06* (2013.01); *H01G 4/232* (2013.01); *H01G 4/30* (2013.01)

(58) Field of Classification Search
CPC ........ H01G 4/30; H01G 4/232; H01G 4/2325; H01G 4/012
(Continued)

(56) References Cited

U.S. PATENT DOCUMENTS 8,508,912 B2  8/2013  Yamamoto et al.
8,675,341 B2  3/2014  Akazawa et al.
(Continued)

FOREIGN PATENT DOCUMENTS

CN    100418769 C    9/2008
CN    102194570 A    9/2011
(Continued)

OTHER PUBLICATIONS

Taiwanese Office Action dated Apr. 27, 2016 issued in Taiwanese Patent Application No. 103129652 (English translation).
(Continued)

*Primary Examiner* — Eric Thomas
*Assistant Examiner* — Arun Ramaswamy
(74) *Attorney, Agent, or Firm* — McDermont Will & Emery LLP (57) ABSTRACT

A multilayer ceramic electronic component may include a ceramic body including a dielectric layer and having first and second main surfaces, first and second side surfaces, and first and second end surfaces, a length of the ceramic body being 1300 μm or less; a first external electrode; a second external electrode; a third external electrode; a first internal electrode connected to the first and second external electrodes; and a second internal electrode connected to the third external electrode. When a thickness of the first to third external electrodes formed on the first and second main surfaces and the first and second side surfaces is defined as to and an interval between adjacent external electrodes among the first to third external electrodes is defined as G, 5≤G/te is satisfied.

26 Claims, 4 Drawing Sheets

Y-Y'

(51) Int. Cl.
*H01G 4/005* (2006.01)
*H01G 4/30* (2006.01)
*H01G 4/232* (2006.01)
*H01G 4/12* (2006.01)
*H01G 2/06* (2006.01)

(58) Field of Classification Search
USPC .................. 361/321.1, 306.1, 303, 321.3
See application file for complete search history.

(56) References Cited

U.S. PATENT DOCUMENTS

| | | | |
|---|---|---|---|
| 2004/0104978 A1 | 6/2004 | Iwashita et al. | |
| 2006/0139849 A1 | 6/2006 | Yoon et al. | |
| 2007/0030628 A1 | 2/2007 | Yamamoto et al. | |
| 2007/0045814 A1* | 3/2007 | Yamamoto | H01G 4/236 257/698 |
| 2007/0217123 A1* | 9/2007 | Togashi | H01G 4/232 361/309 |
| 2008/0186652 A1 | 8/2008 | Lee et al. | |
| 2011/0205684 A1* | 8/2011 | Yamamoto | H01G 4/232 361/305 |
| 2012/0188684 A1 | 7/2012 | Akazawa et al. | |

FOREIGN PATENT DOCUMENTS

| | | |
|---|---|---|
| CN | 102623176 A | 8/2012 |
| JP | 4405477 B2 | 1/2010 |
| JP | 2012-156191 A | 8/2012 |
| KR | 10-2006-0073274 A | 6/2006 |
| KR | 10-2008-0073193 A | 8/2008 |
| KR | 10-2009-0083568 A | 8/2009 |
| KR | 10-2011-0095813 A | 8/2011 |
| KR | 2012-0086660 A | 8/2012 |
| TW | 201205612 A | 2/2012 |

OTHER PUBLICATIONS

Korean Notice of Office Action dated Oct. 12, 2015 issued in Korean Patent Application No. 10-2014-0055776 (English translation).

Chinese Office Action dated Nov. 30, 2016 issued in Chinese Patent Application No. 201410479721.5 (with English translation).

* cited by examiner

MULTILAYER CERAMIC ELECTRONIC COMPONENT AND PRINTED CIRCUIT BOARD HAVING THE SAME

CROSS-REFERENCE TO RELATED APPLICATION

This application claims the benefit of Korean Patent Application No. 10-2013-0126138 filed on Oct. 22, 2013, and Korean Patent Application No. 10-2014-0055776 filed on May 9, 2014, with the Korean Intellectual Property Office, the disclosures of which are incorporated herein by reference.

BACKGROUND

The present disclosure relates to a multilayer ceramic electronic component and a printed circuit board having the same.

The trend toward the densification and high integration of electronic circuits makes space available for passive devices, which are mounted on printed circuit boards (PCBs), insufficient. In order to solve this limitation, efforts have been made to implement components embedded within such PCBs, that is, embeddable devices. Particularly, various methods of embedding a multilayer ceramic electronic component used as a capacitive component in a board have been suggested.

As the method of embedding such a multilayer ceramic electronic component in a board, there is provided a method of using a material of a board itself as a dielectric material for the multilayer ceramic electronic component and using a copper wiring, or the like, as an electrode for the multilayer ceramic electronic component. In addition, Other methods for implementing a multilayer ceramic electronic component to be embedded in a board include a method of forming the multilayer ceramic electronic component to be embedded in the board by forming a polymer sheet having high-k dielectrics and a dielectric thin film within the board, a method of installing a multilayer ceramic electronic component within a board, and the like.

Generally, a multilayer ceramic electronic component includes a plurality of dielectric layers formed of a ceramic material and internal electrodes interposed between the plurality of individual dielectric layers. The multilayer ceramic electronic component is disposed in a board, whereby an embedded type multilayer ceramic electronic component having a high capacitance may be implemented.

In order to manufacture a printed circuit board including a multilayer ceramic electronic component embedded therein, via holes need to be formed in upper and lower multilayer plates using laser processing in order to connect board wirings and external electrodes of the multilayer ceramic electronic component to each other after the multilayer ceramic electronic component is inserted into a core board. Such laser processing significantly increases manufacturing costs of such printed circuit boards.

In a process of embedding the multilayer ceramic electronic component in the board, a heat treatment process for crystallizing metal electrodes is performed after the filling and hardening of an epoxy resin. However, in the case in which the filling of the epoxy resin is not performed so as to allow the multilayer ceramic electronic component to be properly sealed, a fault may occur on an adhesion surface between the board and the multilayer ceramic electronic component. In addition, a fault may occur on the adhesion surface between the board and the multilayer ceramic electronic component due to a difference in coefficients of thermal expansion between the epoxy resin, the metal electrodes, the ceramic of the multilayer ceramic electronic component, and the like, or the thermal expansion of the board. This fault may cause a delamination defect in the adhesion surface in a process of testing reliability.

SUMMARY

Some embodiments of the present disclosure provide a multilayer ceramic electronic component and a printed circuit board having the same.

The multilayer ceramic electronic component may include: a ceramic body including a dielectric layer and having first and second main surfaces opposing each other in a thickness direction, first and second side surfaces opposing each other in a width direction, and first and second end surfaces opposing each other in a length direction, a first external electrode extending from the first end surface onto the first and second main surfaces and the first and second side surfaces; a second external electrode extending from the second end surface onto the first and second main surfaces and the first and second side surfaces; a third external electrode disposed on the ceramic body between the first and second external electrodes to be spaced apart from the first and second external electrodes; a first internal electrode within the ceramic body and connected to the first and second external electrodes; and a second internal electrode disposed to face the first internal electrode within the ceramic body, the dielectric layer being interposed between the first and second internal electrodes, and connected to the third external electrode, wherein when a thickness of the first to third external electrodes formed on the first and second main surfaces and the first and second side surfaces is defined as te and an interval between adjacent external electrodes among the first to third external electrodes is defined as G, 5≤G/te is satisfied.

When the thickness of the first to third external electrodes formed on the first and second main surfaces and the first and second side surfaces is defined as te and the interval between the adjacent external electrodes among the first to third external electrodes is defined as G, G/te≤46 may be satisfied.

The first internal electrode may include a first lead-out portion led-out to the first end surface and a second lead-out portion led-out to the second end surface.

The first internal electrode may include a first lead-out portion led-out to at least one of the first and second side surfaces and the first end surface and a second lead-out portion led-out to at least one of the first and second side surfaces and the second end surface.

The second internal electrode may include one or more of a third lead-out portion led-out to the first side surface and a fourth lead-out portion led-out to the second side surface.

Lengths of the first and second external electrodes extending on the first main surface in the length direction may be 280 to 380 μm.

Length of the third external electrode extending on the first main surface may be 280 to 380 μm.

The interval G between the adjacent external electrodes among the first to third external electrodes may be 80 μm or more.

The multilayer ceramic electronic component further includes copper (Cu) metal layers formed on outermost surfaces of the first to third external electrodes respectively.

The copper (Cu) metal layers have a thickness of 5 μm or more.

A surface roughness of each of the first to third external electrodes may be 200 nm or more and 5 μm or less.

A surface roughness of the ceramic body may be 200 nm or more and 2 μm or less.

The third external electrode may be wound around outer surfaces of the ceramic body to encompass the ceramic body in a band shape.

When an overall area of the first and second main surfaces and the first and second side surfaces of the ceramic body is defined as a and an area of the first to third external electrodes formed on the first and second main surfaces and the first and second side surfaces of the ceramic body is defined b, b/a may be 0.64 or more.

A length of the ceramic body may be 1300 μm or less.

Another embodiment of the present disclosure relates to a printed circuit board having a multilayer ceramic electronic component. The printed circuit board may include: an insulating substrate; and the multilayer ceramic electronic component embedded in the insulating substrate, and including a ceramic body including a dielectric layer and having first and second main surfaces opposing each other in a thickness direction, first and second side surfaces opposing each other in a width direction, and first and second end surfaces opposing each other in a length direction, a first external electrode extending from the first end surface onto the first and second main surfaces and the first and second side surfaces, a second external electrode extending from the second end surface onto the first and second main surfaces and the first and second side surfaces, a third external electrode disposed between the first and second external electrodes to be spaced apart from the first and second external electrodes, a first internal electrode formed on the dielectric layer within the ceramic body and connected to the first and second external electrodes, and a second internal electrode disposed to face the first internal electrode within the dielectric layer, the dielectric layer being interposed between the first and second internal electrodes, and connected to the third external electrode, wherein when a thickness of the first to third external electrodes formed on the first and second main surfaces and the first and second side surfaces is defined as to and an interval between adjacent external electrodes among the first to third external electrodes is defined as G, $5 \leq G/te \leq 46$ is satisfied.

Lengths of the first and second external electrodes extending on the first main surface in the length direction may be 280 to 380 μm.

A length of the third external electrode extending on the first main surface may be 280 to 380 μm.

The interval G between the adjacent external electrodes among the first to third external electrodes may be 80 μm or more.

The multilayer electronic component may include copper (Cu) metal layers formed on outermost surfaces of the first to third external electrodes, respectively, and the copper (Cu) metal layers have a thickness of 5 μm or more.

A surface roughness of each of the first to third external electrodes may be 200 nm or more and 5 μm or less. A surface roughness of the ceramic body may be 200 nm or more and 2 μm or less.

Another embodiment of the disclosure encompasses a multilayer ceramic electronic component. The multilayer ceramic electronic component comprises a ceramic body including a dielectric layer and having first and second main surfaces opposing each other in a thickness direction, first and second side surfaces opposing each other in a width direction, and first and second end surfaces opposing each other in a length direction; a first external electrode covering the first end surface and a portion of the first and second main surfaces and a portion of the first and second side surfaces; a second external electrode covering the second end surface, a portion of the first and second main surfaces and a portion of the first and second side surfaces; a third external electrode disposed on the ceramic body between the first and second external electrodes to be spaced apart from the first and second external electrodes; a first internal electrode within the ceramic body and connected to the first and second external electrodes; a second internal electrode disposed to face the first internal electrode within the ceramic body, the dielectric layer being interposed between the first and second internal electrodes, and connected to the third external electrode; and a metal layer covering the first to third external electrodes, the metal layer having roughness on the outer surface thereof.

BRIEF DESCRIPTION OF DRAWINGS

Embodiments of the present disclosure will be more clearly understood from the following description taken in conjunction with the accompanying drawings.

DETAILED DESCRIPTION

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity, and the same reference numerals will be used throughout to designate the same or like elements.

Figure 1:
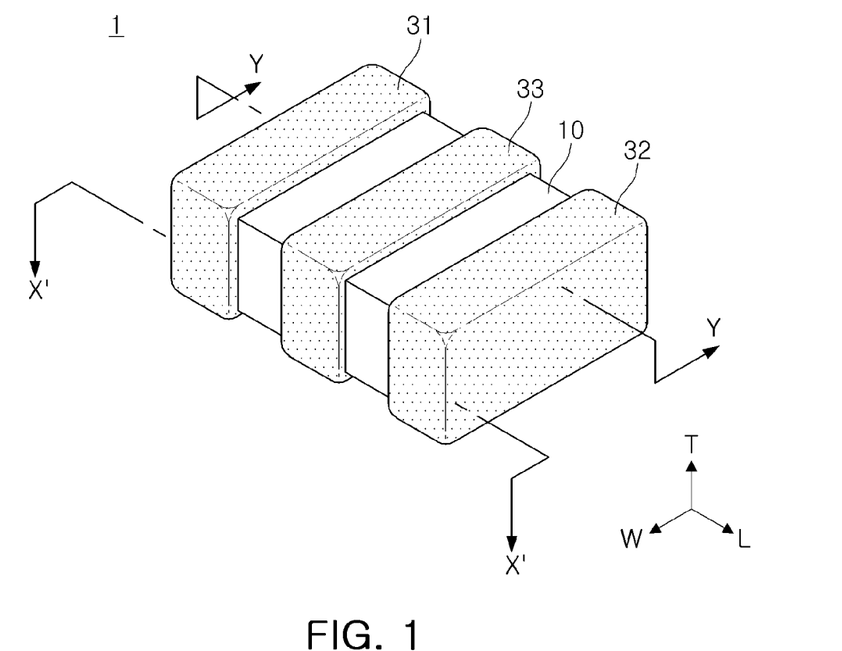
FIG. 1 is a perspective view illustrating a multilayer ceramic electronic component to be embedded in a board according to an exemplary embodiment of the present disclosure.

FIG. 1 is a perspective view illustrating a multilayer ceramic electronic component to be embedded in a board according to an exemplary embodiment of the present disclosure.

Figure 2A:
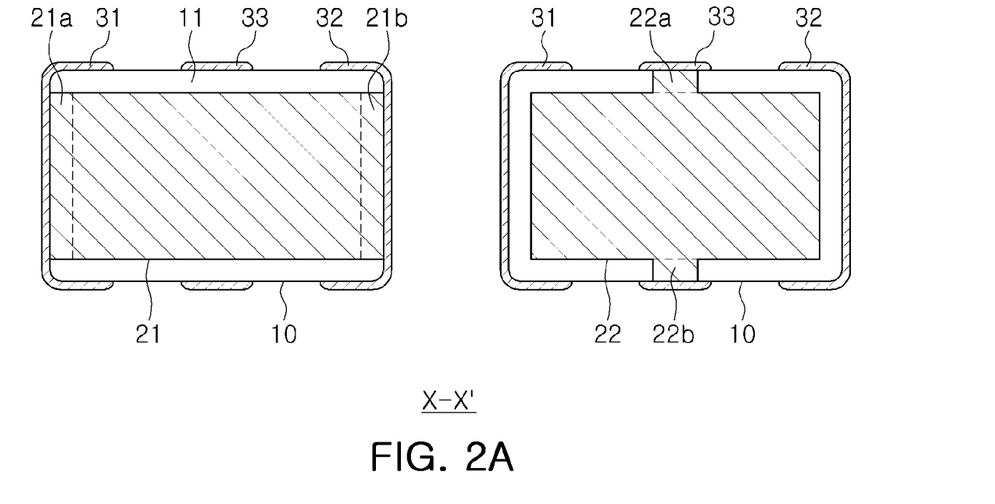
FIGS. 2A and 2B are cross-sectional views taken along line X-X' of FIG. 1.
Figure 2B:
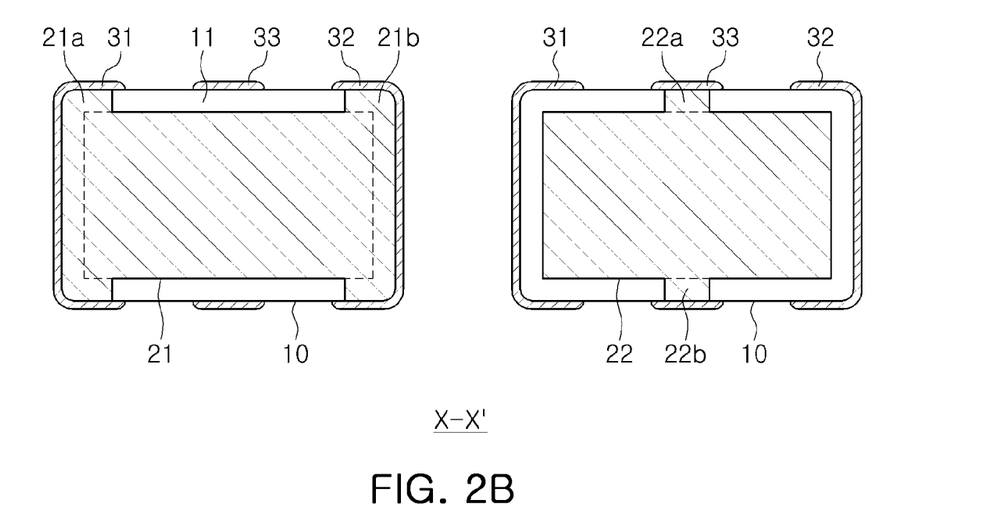

FIGS. 2A and 2B are cross-sectional views taken along line X-X' of FIG. 1.

Figure 3:
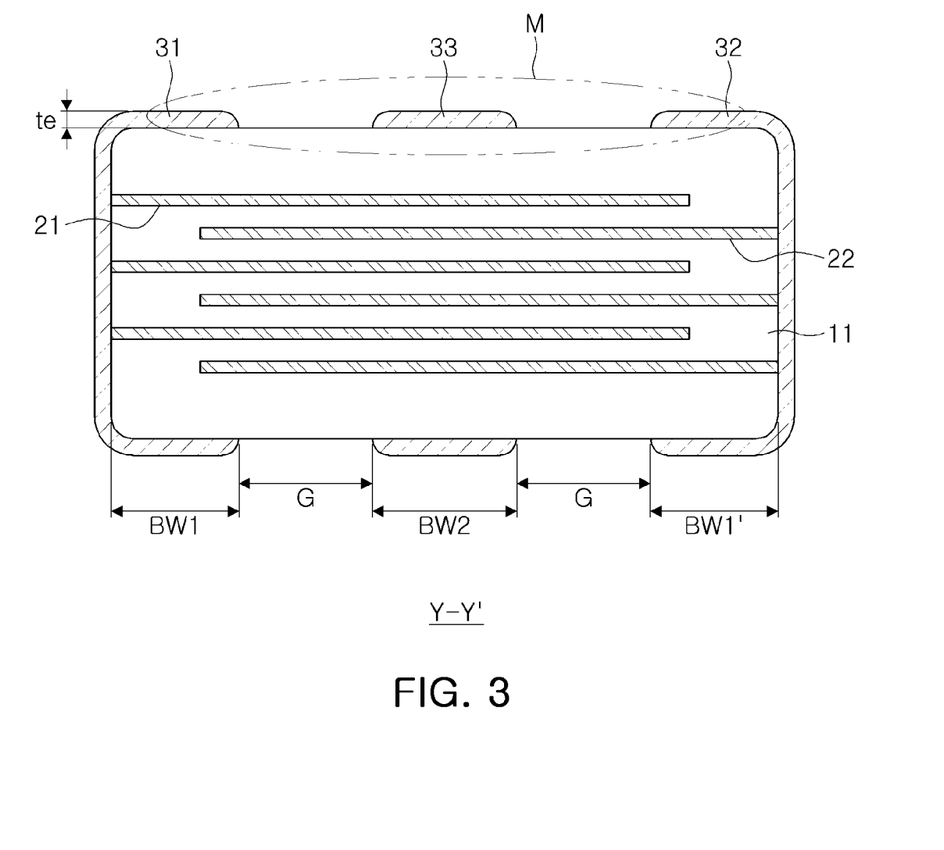
FIG. 3 is a cross-sectional view taken along line Y-Y' of FIG. 1.

FIG. 3 is a cross-sectional view taken along line Y-Y' of FIG. 1.

Referring to FIGS. 1 through 2B, a multilayer ceramic electronic component 1 to be embedded in a board according to an exemplary embodiment of the present disclosure may include a ceramic body 10. The ceramic body includes a dielectric layer 11 and has first and second main surfaces opposing each other in a thickness direction, first and second side surfaces opposing each other in a width direction, and first and second end surfaces opposing each other in a length direction. The multilayer ceramic electronic component 1 further includes a first external electrode 31 extending from the first end surface onto the first and second main surfaces and the first and second side surfaces; a second external electrode 32 extending from the second end surface onto the first and second main surfaces and the first and second side surfaces; and a third external electrode 33 disposed on the ceramic body 10 between the first and second external electrodes to be spaced apart from the first and second external electrodes by predetermined intervals. The multilayer ceramic electronic component further includes a first internal electrode 21 formed within the ceramic body and connected to the first and second external electrodes 31 and 32; and a second internal electrode 22 disposed to face the first internal electrode 21 within the dielectric layer 11. The dielectric layer 11 is interposed between the first and second internal electrodes 22, and the second internal electrode 21 is connected to the third external electrode 33.

Hereinafter, a multilayer ceramic electronic component according to an exemplary embodiment of the present disclosure, particularly, a multilayer ceramic capacitor will be described. However, the present disclosure is not limited thereto.

In the multilayer ceramic capacitor according to an exemplary embodiment of the present disclosure, a 'length direction' refers to an 'L' direction in FIG. 1, a 'width direction' refers to a 'W' direction in FIG. 1, and a 'thickness direction' refers to a 'T' direction in FIG. 1. Here, the 'thickness direction' is the same as a direction in which dielectric layers are stacked, that is, a 'stacking direction'.

In an exemplary embodiment of the present disclosure, a shape of the ceramic body 10 is not particularly limited, but may be a hexahedral shape as shown.

In an exemplary embodiment of the present disclosure, the ceramic body 10 may have the first and second main surfaces opposing each other in the thickness T direction, the first and second side surfaces opposing each other in the width W direction, and the first and second end surfaces opposing each other in the length L direction. Here, the first and second main surfaces may also be termed upper and lower surfaces of the ceramic body 10.

The first main surface may be a surface on which via processing is performed after the multilayer ceramic capacitor is embedded in a board.

The ceramic body may have a length of 1300 μm or less. In addition, the ceramic body may have a width of 500 μm or less and a thickness of 250 μm or less, but is not limited thereto.

The ceramic body 10 may be manufactured to have a thickness is of 250 μm or less, which may be appropriate for a multilayer ceramic capacitor to be embedded in a board.

The length of the ceramic body refers to a distance between the first and second end surfaces, the width of the ceramic body refers to a distance between the first and second side surfaces, and the thickness of the ceramic body refers to a distance between the first and second main surfaces.

According to an exemplary embodiment of the present disclosure, a raw material for forming the dielectric layer 11 is not particularly limited as long as a sufficient capacitance may be obtained, but may be, for example, a barium titanate ($BaTiO_3$) powder.

As a material for forming the dielectric layer 11, various ceramic additives, organic solvents, plasticizers, binders, dispersing agents, and the like, may be added to a powder such as a barium titanate ($BaTiO_3$) powder, or the like, according to an object of the present disclosure.

An average particle size of the ceramic powder used for forming the dielectric layer 11 is not particularly limited, but may be adjusted in order to accomplish an object of the present disclosure, and may be adjusted to be, for example, 400 nm or less.

A material for forming the first and second internal electrodes 21 and 22 is not particularly limited, but may be a conductive paste including at least one selected from for example, a noble metal material such as palladium (Pd), a palladium-silver (Pd—Ag) alloy, or the like, nickel (Ni), and copper (Cu), and the first and second internal electrodes 21 and 22 may be stacked to face each other with the dielectric layer 11 interposed therebetween.

The first and second external electrodes 31 and 32 may have the same polarity and may be electrically connected to the first internal electrode 21.

The first and second external electrodes may be formed on the first and second end surfaces of the ceramic body, respectively. Particularly, the first external electrode 31 may extend from the first end surface onto the first and second main surfaces and the first and second side surfaces while enclosing edges of the ceramic body, abutting on the first end surface. In addition, the second external electrode 32 may extend from the second end surface onto the first and second main surfaces and the first and second side surfaces while enclosing edges of the ceramic body, abutting on the second end surface.

When the multilayer ceramic capacitor is embedded in a circuit board, regions of the first and second external electrodes extending onto the first main surface may be connected to vias.

The third external electrode 33 electrically connected to the second internal electrode 22 may have a polarity different from that of the first and second external electrodes 31 and 32, and may be disposed between the first and second external electrodes to be spaced apart from the first and second external electrodes 31 and 32 by predetermined intervals.

The third external electrode 33 may be extended from at least one of the first and second side surfaces to at least one of the first and second main surfaces. In addition, the third external electrode 33 may be formed to cover central portions of the first and second side surfaces and the first and second main surfaces. That is, the third external electrode 33 may be wound around central portions of outer surfaces of the ceramic body in the length direction to encompass the ceramic body in a band shape.

When the multilayer ceramic capacitor is embedded in a circuit board, a region of the third external electrode extended onto the first main surface may be connected to a conductive via.

The first and second external electrodes 31 and 32 may contain a conductive metal and glass.

The first to third external electrodes 31 to 33 may be formed of the same conductive material as that of the first and second internal electrodes 21 and 22, but are not limited thereto. For example, the first to third external electrodes 31 to 33 may be formed of at least one conductive metal selected from a group consisting of copper (Cu), silver (Ag), nickel (Ni), and an alloy thereof.

The first to third external electrodes 31 to 33 may be formed by applying a conductive paste prepared by adding a glass frit to conductive metal particles and then, sintering the paste, but are not limited thereto.

FIGS. 2A and 2B, cross-sectional views of the multilayer ceramic electronic component, taken along line X-X' of FIG. 1, are plan views illustrating shapes of the first and second internal electrodes 21 and 22 according to an exemplary embodiment of the present disclosure.

Referring to FIGS. 2A and 2B, the first and second internal electrodes 21 and 22 may be alternately formed on the dielectric layer 11 within the ceramic body 10. The respective internal electrodes 21 and 22 may be divided into a main portion and lead-out portions (boundary portions between the main portion and the lead-out portions are denoted by dotted lines for convenience of understanding in FIGS. 2A and 2B). The 'main portion' of the internal electrodes, a portion in which the first and second internal electrodes facing each other are overlapped with each other when viewed in the stacking direction, may contribute to a capacitance formation, and the 'lead-out portions' of the internal electrodes may be extended from the main portion to be connected to the external electrodes.

As shown in FIG. 2A, according to an exemplary embodiment of the present disclosure, the first internal electrode 21 may include a first lead-out portion 21a led-out to the first end surface of the ceramic body 10 and connected to the first external electrode and a second lead-out portion 21b led-out to the second end surface of the ceramic body 10 and connected to the second external electrode.

In addition, the second internal electrode 22 may include one or more of a third lead-out portion 22a led-out to the first side surface and connected to the third external electrode and a fourth lead-out portion 22b led-out to the second side surface and connected to the third external electrode.

According to an exemplary embodiment of the present disclosure, the external electrodes may be configured of three terminals as described above to increase the number of current paths through the internal electrodes and decrease lengths of the current paths, whereby an amount of an equivalent series inductance (ESL) of the capacitor may be decreased.

According to another exemplary embodiment of the present disclosure, as shown in FIG. 2B, the first internal electrode 21 may include a first lead-out portion 21a led-out to at least one of the first and second side surfaces and the first end surface and connected to the first external electrode and a second lead-out portion 21b led-out to at least one of the first and second side surfaces and the second end surface.

That is, unlike an exemplary embodiment of FIG. 2A, according to an exemplary embodiment of FIG. 2B, the first and second lead-out portions 21a and 21b may be led-out to at least one of the first and second side surfaces of the ceramic body as well as to the first and second end surfaces of the ceramic body. In addition, the first lead-out portion 21a may be led-out to the first end surface and the first and second side surfaces of the ceramic body, and the second lead-out portion 22b may be led-out to the second end surface and the first and second side surfaces of the ceramic body. The number of current paths may be increased and the lengths of the current paths may be decreased in the case in which the first and second lead-out portions are led-out to the first and second end surfaces and the first and second side surfaces as described above as compared with the case in which the first and second lead-out portions are only led-out to the first and second end surfaces, whereby a multilayer ceramic capacitor having an amount of an equivalent series inductance (ESL) lower than that of an exemplary embodiment FIG. 2A may be provided.

Next, the first to third external electrodes will be described in more detail with reference to FIG. 3, a cross-sectional view taken along line Y-Y' of FIG. 1.

According to an exemplary embodiment of the present disclosure, when a thickness of the first to third external electrodes 31 to 33 formed on the first and second main surfaces and the first and second side surfaces is defined as to and an interval between adjacent external electrodes among the first to third external electrodes is defined as G, $5 \leq G/te$ may be satisfied.

The thickness of the first to third external electrodes formed on the first and second main surfaces and the first and second side surfaces and the interval between the adjacent external electrodes may be measured by scanning images of a cross-section of the ceramic body in a length-width direction as shown in FIGS. 2A and 2B and a cross-section of the ceramic body in a length-thickness direction as shown in FIG. 3, using a scanning electron microscope (SEM).

The thickness to of the first to third external electrodes formed on the first and second main surfaces and the first and second side surfaces may refer to an average thickness of the first to third external electrodes, and the interval G between the adjacent external electrodes among the first to third external electrodes may be an average of an interval between the first and third external electrodes and an interval between the second and third external electrodes.

For example, the thickness of the first to third external electrodes 31 to 33 and the interval between adjacent external electrodes may be measured from an image obtained by scanning a cross-section of the ceramic body cut in a length-thickness (L-T) direction, in a central portion of the ceramic body 10 in the width (W) direction, as shown in FIG. 3.

In the case in which G/te is below 5, a resin composition provided to embed the multilayer ceramic capacitor when the multilayer ceramic capacitor is embedded in a board may not be completely filled in the interval (gap) between the external electrodes, such that it may not completely enclose the multilayer ceramic capacitor, and a delamination defect in which space is generated between an insulating part (that may be formed by hardening the resin component) embedding the multilayer ceramic capacitor therein and the multilayer ceramic capacitor, may occur.

In addition, according to an exemplary embodiment of the present disclosure, when a thickness of the first to third external electrodes 31 to 33 formed on the first and second main surfaces and the first and second side surfaces is defined as to and an interval between adjacent external electrodes among the first to third external electrodes is defined as G, $G/te \leq 46$ may be satisfied.

In the case in which G/Te exceeds 46, band widths BW1, BW1', and BW2 of the external electrodes may be decreased due to an increase in the interval between the adjacent external electrodes, such that a defect may occur in processing the conductive via.

A minimum thickness of the external electrode required for embedding the multilayer ceramic electronic component in the board may be 5 μm, a minimum thickness of an external electrode metal layer required for processing the conductive via. In addition, in the case in which the interval G between the adjacent external electrodes exceeds 230 μm, the bandwidths BW1, BW1', and BW2 of the external electrodes may be decreased, such that the defect may occur in processing the conductive via. Therefore, an upper limit value of G/te capable of preventing delamination defects while preventing defects in processing the conductive via may be 230/5, that is, 46.

In an exemplary embodiment of the present disclosure, distances of the first and second external electrodes formed on the first main surface in the length direction may be 280 to 380 μm. The length of the first external electrode extending on the first main surface in the length direction may be considered to be the band width BW1 of the first external electrode on the first main surface, and the length of the second external electrode extending on the first main surface in the length direction may be considered to be the band width BW1' of the second external electrode on the first main surface.

The first and second external electrodes may be extended onto the second main surface and the first and second side surfaces by amounts substantially the same as the lengths by which they extend onto the first main surface.

As shown in FIG. 3, the band width BW1 of the first external electrode extending on the first main surface and the band width BW1' of the second external electrode extending on the first main surface may be 280 to 380 μm.

In addition, the third external electrode may have the band width BW2 of 280 to 380 μm on the first main surface, and may have band widths substantially the same as the band width BW2 on the second main surface and the first and second side surfaces.

The first to third external electrodes are formed such that each of BW1, BW1', and BW2 is in a range of 280 to 380 μm in the ceramic body having a length of about 1300 μm to implement external electrode band widths having predetermined levels on the first main surface, whereby a contact defect between vias and the external electrodes occurring at the time of processing the via in order to electrically connect the embedded multilayer ceramic capacitor and circuits formed on the board to each other may be prevented and moisture resistance characteristics may be secured.

In the case in which BW1, BW1', and BW2 are below than 280 μm, the band widths of the external electrodes are narrow, such that contact defects between the external electrodes and the circuit and vias may occur when the multilayer ceramic capacitor is embedded in the board, and in the case in which BW1, BW1', and BW2 exceed 380 μm, a level of insulation resistance between the external electrodes may be decreased and moisture resistance defects such as a decrease in IR may occur when humidity is increased.

In the multilayer ceramic capacitor according to an exemplary embodiment of the present disclosure, a capacitor to be embedded in a board, an area occupied by the external electrodes may be greater than that in a capacitor to be mounted on the board. When an overall area of the first and second main surfaces and the first and second side surfaces of the ceramic body is defined as a and an area of the first to third external electrodes formed on the first and second main surfaces and the first and second side surfaces of the ceramic body is defined b, b/a may be 0.64 or more. b/a may be set to be 0.64 or more, whereby contact properties between the external electrodes of the multilayer ceramic capacitor and the conductive vias may be improved.

According to an exemplary embodiment of the present disclosure, the interval G between the adjacent external electrodes among the first to third external electrodes may be 80 μm or more.

In the case in which the interval between the external electrodes is less than 80 μm, a level of insulation resistance between the external electrodes may be decreased and IR may be deteriorated when humidity is increased.

Figure 4:
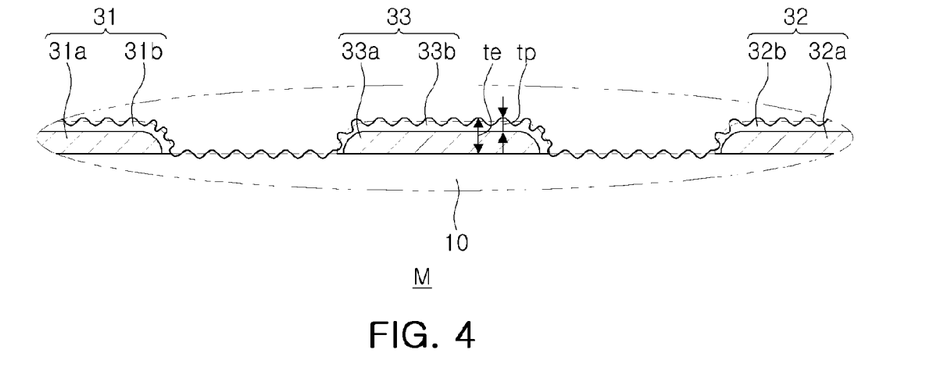
FIG. 4 is an enlarged view of the region M of FIG. 3.

FIG. 4 is an enlarged view of region M of FIG. 3.

As shown in FIG. 4, the multilayer ceramic electronic component may include copper (Cu) metal layers 31b to 33b formed on outermost surfaces of the first to third external electrodes 31-33, respectively.

Generally, since a multilayer ceramic capacitor is mounted on a printed circuit board, a nickel/tin plating layer may commonly be formed on an external electrode.

However, in the multilayer ceramic capacitor according to an exemplary embodiment of the present disclosure, to be embedded in a printed circuit board, the first to third external electrodes 31 to 33 of the multilayer ceramic capacitor and circuits of the board may be electrically connected to each other through vias formed of copper (Cu).

Therefore, according to an exemplary embodiment of the present disclosure, multilayer ceramic electronic component may include the metal layers 31b, 32b, and 33b formed on the outermost surfaces of the first to third external electrodes 31-33 respectively, and formed of copper (Cu) in order to improve electrical connectivity with the vias.

Meanwhile, electrode layers 31a to 33a formed inwardly of the metal layers of the first to third external electrodes, respectively, may contain copper (Cu) as a main component thereof, but may also generally contain glass. Therefore, a component contained in the glass may absorbs laser light during laser processing in order to form the vias in the board, such that depths of the vias may not be properly adjusted.

Therefore, according to an exemplary embodiment of the present disclosure, the metal layers 31b, 32b, and 33b are formed on the outermost surfaces of the first to third external electrodes 31-33, respectively, and formed of copper (Cu) to solve the above-mentioned defect.

A method of forming the metal layers formed of copper (Cu) is not particularly limited, but may be, for example, a plating method.

Another method of forming the metal layers formed of copper (Cu) may be performed by a method of applying a conductive paste that contain copper (Cu) and do not contain a glass frit to the first and second external electrodes 31 and 32, but is not particularly limited thereto.

In the method of applying the conductive paste, the metal layers after being sintered may only be formed of copper (Cu).

A thickness tp of the metal layer formed of the copper (Cu) may be 5 μm or more. The thickness of the metal layer may be 5 to 15 μm, but is not limited thereto.

The thickness of the metal layer is adjusted to be equal to or greater than 5 μm and equal to or smaller than 15 μm as described, whereby a multilayer ceramic capacitor allowing for excellent via processing characteristics and having excellent reliability at the time of being installed in the board may be implemented.

Figure 5:
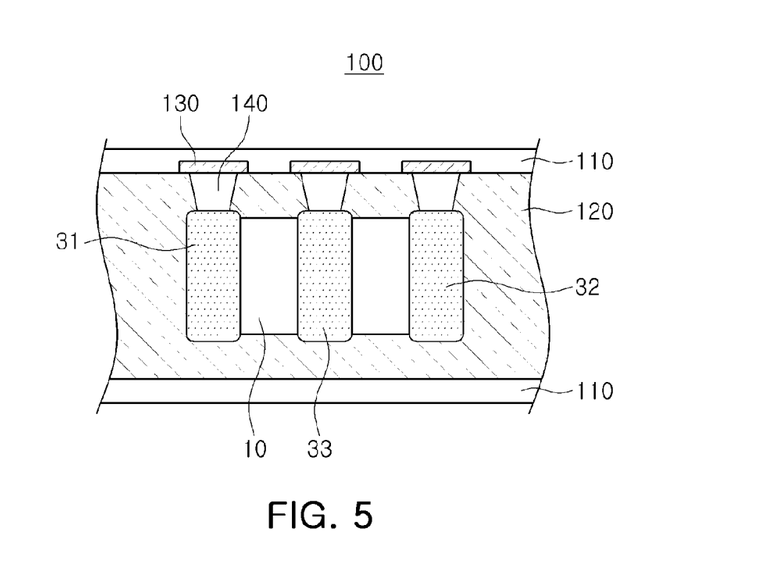
FIG. 5 is a cross-sectional view illustrating a circuit board having an electronic component embedded therein according to an exemplary embodiment of the present disclosure.

In the case in which the thickness of the metal layer is less than 5 μm, when the multilayer ceramic electronic component is embedded in a printed circuit board 100, a via processing defect in which conductive vias 140 are connected up to the ceramic body 10 at the time of processing the conductive vias may occur.

In the case in which the thickness of the metal layer exceeds 15 μm, cracks may occur in the ceramic body 10 due to stress on the metal layer.

According to an exemplary embodiment of the present disclosure, a surface roughness of each of the first to third external electrodes 31 to 33 may be 200 nm or more and 5 μm or less. In the case in which the outermost layers of the first to third external electrodes are the metal layers formed of copper (Cu), a surface roughness of each of the metal layers 31a to 33a may be 200 nm or more and 5 μm or less.

The surface roughness of each of the first to third external electrodes is adjusted to be 200 nm or more and 5 μm or less, whereby a delamination phenomenon between the multilayer ceramic electronic component and the board may be decreased and cracks may be prevented.

The surface roughness indicates a degree of fine depressions and protrusions formed in and on a metal surface when the metal surface is processed.

The surface roughness may be formed by a tool used for processing the metal surface, whether or not a processing method is appropriate, grooves formed as a surface is scratched, rust, and the like. A surface is cut in a direction perpendicular thereto such that a cross-section thereof has a certain curved line. An average of distances between the curved line and a virtual center line may be termed a center line average roughness (Ra) and may be used to represent a degree of roughness.

In an exemplary embodiment of the present disclosure, the surface roughness may be interpreted as the center line average roughness.

In an exemplary embodiment of the present disclosure, the center line average roughness Ra may be calculated by the following method.

First, a virtual center line may be drawn with respect to a roughness formed on the surface.

Next, respective distances (for example, $r_1, r_2, r_3 \ldots r_{13}$) to crests and troughs of the surface based on the virtual center line of the roughness may be measured, an average value of the respective distances may be calculated and represented by the following Equation, and the center line average roughness Ra of each of the first to third metal layers $31b$ to $33b$ may be calculated using the calculated average value.

$$R_a = \frac{|r_1| + |r_2| + |r_3| + \cdots |r_n|}{n}$$

In the case in which the surface roughness of each of the first to third external electrodes is less than 200 nm, a delamination phenomenon between the multilayer ceramic electronic component and the board may occur.

In the case in which the surface roughness of each of the first to third external electrodes exceeds 5 μm, cracks may occur. In addition, in the case in which the surface roughness of each of the first to third external electrodes exceeds 5 μm, surface roughness may be excessively increased, such that it may be difficult to provide a resin for forming an insulating part of the board in depression portions of the surfaces of the external electrodes. Therefore, adhesion properties between the external electrodes and the board may be decreased.

Further, according to an exemplary embodiment of the present disclosure, a surface roughness of an exposed surface of the ceramic body 10 before the external electrodes are formed may be 200 nm or more and 2 μm or less. The surface roughness of the ceramic body may also be calculated as a center line average roughness and may be calculated by the above-mentioned method.

In an exemplary embodiment of the present disclosure, the exposed surface of the ceramic body may refer to regions of surfaces of the ceramic body not covered by the external electrodes, but not completely exposed to the outside, and may refer to regions of the ceramic body coming into contact with the insulating part of the board in the embedding of the multilayer ceramic capacitor in the board.

In the case in which the surface roughness of the exposed surface of the ceramic body is less than 200 nm, a delamination phenomenon between the multilayer ceramic electronic component and the board may occur.

In addition, in the case of the multilayer ceramic electronic component to be embedded in a board, since a thickness of the ceramic body is small, when the surface roughness of the exposed surface of the ceramic body exceeds 2 μm, cracks may occur in the ceramic body due to impacts occurring in a process of manufacturing the multilayer ceramic electronic component or impacts occurring in a process of embedding the multilayer ceramic electronic component in the board.

In a method of manufacturing a multilayer ceramic electronic component to be embedded in a board according to an exemplary embodiment of the present disclosure, a plurality of ceramic green sheets may first be prepared by applying slurry including a powder such as a barium titanate ($BaTiO_3$) powder and the like to carrier films and drying the same, thereby forming dielectric layers.

The slurry may be prepared by mixing a ceramic powder, a binder, and a solvent, and the slurry may be formed in a sheet shape having a thickness of several μm by a doctor blade method.

Next, a conductive paste for internal electrodes, including 40 to 50 parts by weight of a nickel powder having a nickel particle average size of 0.1 to 0.2 μm may be prepared.

The average particle size and the content of the nickel powder are not limited thereto.

After the conductive paste for internal electrodes is applied to the ceramic green sheets by a screen printing method to form internal electrodes, the ceramic green sheets may be stacked and sintered to form a ceramic body.

Next, first to third electrode layers containing a conductive metal and glass may be formed on outer surfaces of the ceramic body.

The conductive metal is not particularly limited, but may be, for example, at least one selected from a group consisting of copper (Cu), silver (Ag), nickel (Ni), and an alloy thereof.

The glass is not particularly limited, but may be a material having the same composition as that of glass used to manufacture an external electrode of a general multilayer ceramic capacitor.

The first and second electrode layers may be electrically connected to the first internal electrode, and the third electrode layer may be electrically connected to the second internal electrode.

Next, in the case in which the first to third external electrodes include metal layers formed of copper (Cu), respectively, a process of forming the metal layers formed of copper (Cu) on the first to third electrode layers, respectively, may be performed.

The process of forming the first and second metal layers containing copper (Cu) is not particularly limited, but may be performed by, for example, plating.

Next, a process of artificially adjusting surface roughnesses of the first to third external electrodes and the exposed outer surface of the ceramic body to a predetermined level may be performed.

The surface roughnesses of the first to third external electrodes and the surface roughness of the exposed surface of the ceramic body may be adjusted by chemical polishing using an etchant and by a sand blasting method, respectively, but are not limited thereto.

FIG. 5 is a cross-sectional view illustrating a printed circuit board 100 having a multilayer ceramic electronic component embedded therein according to an exemplary embodiment of the present disclosure.

Referring to FIG. 5, the printed circuit board 100 having a multilayer ceramic electronic component embedded therein may include an insulating substrate 110; and the multilayer ceramic electronic component 100 according to an exemplary embodiment of the present disclosure.

The insulating substrate 110 may include an insulating part 120 for embedding the multilayer ceramic electronic component therein and if necessary, may also include a conductive pattern 130 and conductive vias 140 that configure interlayer circuits in various forms as shown in FIG. 5. The insulating substrate 110 may be the printed circuit board 100 including the multilayer ceramic electronic component disposed therein.

The multilayer ceramic capacitor 1 may be buried and embedded in a resin composition forming the insulating part 120 at the time of being embedded in the printed circuit board. According to an exemplary embodiment of the present disclosure, the thicknesses of the external electrodes and the interval between the external electrodes are adjusted, such that the resin composition may efficiently enclose the outer surfaces of the multilayer ceramic capacitor, and the occurrence of a delamination defect between the multilayer ceramic capacitor 1 and the insulating part 120 burying the multilayer ceramic capacitor 1 therein may be prevented.

Meanwhile, after the multilayer ceramic electronic component is inserted into the printed circuit board 100, it may be subject to several severe environmental conditions during a post-process such as a heat treating process, and the like, of the printed circuit board 100.

Particularly, in the heat treating process, contraction and expansion stress of the printed circuit board 100 may be directly transferred to the multilayer ceramic electronic component inserted into the printed circuit board 100 to thereby apply stress to an adhesion surface between the multilayer ceramic electronic component and the printed circuit board 100.

In the case in which a degree of the stress applied to adhesion surfaces of the multilayer ceramic electronic component and the printed circuit board 100 is higher than adhesion strength therebetween, delamination defects in which the adhesion surfaces are detached from each other may occur.

The adhesion strength between the multilayer ceramic electronic component and the printed circuit board 100 may be in proportion to an electrochemical coupling force between the multilayer ceramic electronic component and the printed circuit board 100 and an effective surface area of the adhesion surface between the multilayer ceramic electronic component and the printed circuit board 100. Therefore, the surface roughness of the multilayer ceramic electronic component is controlled in order to increase the effective surface area of the adhesion surface between the multilayer ceramic electronic component and the printed circuit board 100, whereby the delamination phenomenon between the multilayer ceramic electronic component and the printed circuit board 100 may be decreased.

Hereafter, although the present disclosure will be described in more detail with reference to the Experimental Example, the present disclosure is not limited thereto.

EXPERIMENTAL EXAMPLE

In order to confirm (i) whether or not a delamination defect between the multilayer ceramic capacitor 1 and the insulating part 120 occurred, (ii) whether or not a contact defect between the multilayer ceramic capacitor and the vias 140 occurred in the board, depending on a ratio of the interval between adjacent external electrodes among the first to third external electrodes to the thickness to of the first to third external electrodes 31 to 33 formed on the first and second main surfaces and the first and second side surfaces of the multilayer ceramic electronic component to be embedded in the board according to an exemplary embodiment of the present disclosure, (iii) to confirm whether or not a contact defect between the multilayer ceramic capacitor 1 and the vias 140 in the board occurred and whether or not a moisture resistance defect occurred depending on the bandwidths BW1, BW1', and BW2 of the first to third external electrodes, and (iv) to confirm whether or not a delamination defect and cracks occurred depending on the surface roughnesses of the first to third external electrodes 31 to 33 and the exposed surface of the ceramic body 10, respective characteristics were evaluated while changing the band widths BW1, BW1', and BW2 of the first to third external electrodes, the thickness te of the first to third external electrodes, and the surface roughnesses of the first to third external electrodes and the exposed surface of the ceramic body.

The following Experimental Example uses the ceramic body 10, of which length×width×thickness was about 1300 μm×500 μm×250 μm, and in the present Experimental Example, the first to third external electrodes include sintering type electrode layers containing copper and glass and copper metal layers formed on the electrode layers, respectively.

The following Table 1 shows results regarding a delamination defect in an adhesion surface between the multilayer ceramic capacitor and the insulating part and a contact defect between the external electrodes and the vias depending on the ratio (G/te) of the interval G (referred to as a gap between the external electrodes in the following Table 1) between adjacent external electrodes among the first to third external electrodes to the thickness te (referred to as a thickness of the external electrode in the following Table 1) of the first to third external electrodes. An experiment of Table 1 is performed under the condition that surface roughnesses of the first to third external electrodes and the exposed surface of the ceramic body were 200 nm, widths of the first to third external electrodes were the same as each other, and two intervals between adjacent external electrodes among the external electrodes are the same as each other.

TABLE 1

| Thickness of External Electrode (μm) | Interval Between External Electrodes (μm) | G/te | Decision on Delamination Defect | Contact Defect |
|---|---|---|---|---|
| 5 | 30 | 6 | ○ | ○ |
| 5 | 50 | 10 | ○ | ○ |
| 5 | 70 | 14 | ○ | ○ |
| 5 | 100 | 20 | ○ | ○ |
| 5 | 150 | 30 | ○ | ○ |
| 5 | 200 | 40 | ○ | ○ |
| 5 | 230 | 46 | ○ | ○ |
| 5 | 250 | 50 | ○ | X |
| 10 | 30 | 3 | △ | ○ |
| 10 | 50 | 5 | ○ | ○ |
| 10 | 70 | 7 | ○ | ○ |
| 10 | 100 | 10 | ○ | ○ |
| 10 | 150 | 15 | ○ | ○ |
| 10 | 200 | 20 | ○ | ○ |
| 15 | 30 | 2 | △ | ○ |
| 15 | 50 | 3.3 | △ | ○ |
| 15 | 70 | 4.7 | △ | ○ |
| 15 | 100 | 6.7 | ○ | ○ |
| 15 | 150 | 10 | ○ | ○ |
| 15 | 200 | 13.3 | ○ | ○ |
| 20 | 30 | 1.5 | △ | ○ |
| 20 | 50 | 2.5 | △ | ○ |
| 20 | 70 | 3.5 | △ | ○ |
| 20 | 100 | 5 | ○ | ○ |

TABLE 1-continued

| Thickness of External Electrode (μm) | Interval Between External Electrodes (μm) | G/te | Decision on Delamination Defect | Contact Defect |
|---|---|---|---|---|
| 20 | 150 | 7.5 | ○ | ○ |
| 20 | 200 | 10 | ○ | ○ |
| 25 | 30 | 1.2 | Δ | ○ |
| 25 | 50 | 2 | Δ | ○ |
| 25 | 70 | 2.8 | Δ | ○ |
| 25 | 100 | 4 | Δ | ○ |
| 25 | 150 | 6 | ○ | ○ |
| 25 | 200 | 8 | ○ | ○ |

○: defect rate less than 0.1%
Δ: defect rate equal to or more than 0.1% and less than 10%
X: defect rate of 10% or more Referring to Table 1 above, it may be appreciated that a delamination defect rarely occurred in the case in which a value of G/te is 5 or more, while delamination defects frequently occurred in the case in which the value of G/te is less than 5. In addition, it may be appreciated that a contact defect between the external electrodes and the conductive vias does not occur in the case in which the value of G/te is 46 or less, while the contact defect between the external electrodes and the conductive vias occurs in the case in which the value of G/te exceeds 46.

The following Table 2 shows whether or not a contact defect and a moisture resistance defect occurs depending on the distances of the first to third external electrodes formed on the first main surface of the ceramic body, that is, the band widths BW1, BW1', and BW2 of the first to third external electrodes on the first main surface, and the interval G between the external electrodes.

The first main surface may be a surface on which vias are processed after the multilayer ceramic capacitor is embedded in a board.

The band widths of the first and second external electrodes may refer to distances by which the first and second external electrodes extend from edges of the end surfaces of the ceramic body to the first main surface thereof, respectively.

In the experimental example of the following Table 2, the band width BW1 of the first external electrode and the band width BW1' of the second external electrode are substantially the same as each other, and only the band width of the first external electrode is shown in the following Table 2 for convenience of denotation.

The moisture resistance defect is evaluated after the board in which the multilayer ceramic electronic component is embedded is left at a temperature of 85° C. and a relative humidity of 85%, which are general experimental conditions of a chip component for a mobile phone mother board, for 30 minutes.

TABLE 2

| Band Width (μm) of First External Electrode | Band Width (μm) of Second External Electrode | Interval Between External Electrodes | Contact Defect | Moisture Resistance Defect |
|---|---|---|---|---|
| 150 | 150 | 425 | X | ○ |
| 150 | 200 | 400 | X | ○ |
| 150 | 240 | 380 | X | ○ |
| 150 | 280 | 360 | X | ○ |
| 150 | 320 | 340 | X | ○ |
| 150 | 380 | 310 | X | ○ |
| 150 | 420 | 290 | X | ○ |
| 200 | 150 | 375 | X | ○ |
| 200 | 200 | 350 | X | ○ |
| 200 | 240 | 330 | X | ○ |
| 200 | 280 | 310 | Δ | ○ |
| 200 | 320 | 290 | Δ | ○ |
| 200 | 380 | 260 | Δ | ○ |
| 200 | 420 | 240 | Δ | ○ |
| 240 | 150 | 335 | X | ○ |
| 240 | 200 | 310 | X | ○ |
| 240 | 240 | 290 | Δ | ○ |
| 240 | 280 | 270 | Δ | ○ |
| 240 | 320 | 250 | Δ | ○ |
| 240 | 380 | 220 | Δ | ○ |
| 240 | 420 | 200 | Δ | ○ |
| 280 | 150 | 295 | X | ○ |
| 280 | 200 | 270 | X | ○ |
| 280 | 240 | 250 | Δ | ○ |
| 280 | 280 | 230 | ○ | ○ |
| 280 | 320 | 210 | ○ | ○ |
| 280 | 380 | 180 | ○ | ○ |
| 280 | 420 | 160 | ○ | ○ |
| 320 | 150 | 255 | X | ○ |
| 320 | 200 | 230 | X | ○ |
| 320 | 240 | 210 | Δ | ○ |
| 320 | 280 | 190 | ○ | ○ |
| 320 | 320 | 170 | ○ | ○ |
| 320 | 380 | 140 | ○ | ○ |
| 320 | 420 | 120 | ○ | ○ |
| 380 | 150 | 195 | X | ○ |
| 380 | 200 | 170 | X | ○ |
| 380 | 240 | 150 | Δ | ○ |
| 380 | 280 | 130 | ○ | ○ |
| 380 | 320 | 110 | ○ | ○ |
| 380 | 380 | 80 | ○ | ○ |
| 380 | 420 | 60 | ○ | Δ |
| 420 | 150 | 155 | X | ○ |
| 420 | 200 | 130 | X | ○ |
| 420 | 240 | 110 | Δ | ○ |
| 420 | 280 | 90 | ○ | ○ |
| 420 | 320 | 70 | ○ | Δ |
| 420 | 380 | 40 | ○ | X |
| 420 | 420 | 20 | ○ | X |

○: defect rate less than 0.01%
Δ: defect rate equal to or more than 0.1% and less than 10%
X: defect rate of 10% or more Referring to Table 2 above, it may be appreciated that a contact defect between the multilayer ceramic capacitor and the vias in the board occurs in the case in which the band widths of the first to third external electrodes are less than 280 μm, while the contact defect between the multilayer ceramic capacitor and the vias in the board do not occur in the case in which the band widths of the first to third external electrodes were 280 μm or more.

In addition, it may be appreciated that the moisture resistance defect occurs in the case in which the band width of each of the first to third external electrodes exceed 380 μm, such that the interval between the external electrodes is less than 80 μm.

The following Table 3 shows whether or not a via processing defect occurs depending on the thicknesses of the first to third metal layers formed on the outermost layers of the first to third external electrodes.

TABLE 3

| Thickness (μm) of Metal Layer | Decision |
|---|---|
| less than 1 | X |
| 1~2 | X |
| 2~3 | X |
| 3~4 | Δ |
| 4~5 | ○ |
| 5~6 | ◎ |
| 6 or more | ◎ |

◎: via processing defect rate less than 0.01%
○: via processing defect rate equal to or more than 0.01% and less than 1%
Δ: via processing defect rate equal to or more than 1% and less than 10%
X: via processing defect rate of 10% or more Referring to Table 3 above, it may be appreciated that a multilayer ceramic capacitor allowing for excellent via processing characteristics in the board and having excellent reliability may be implemented in the case in which the thickness of each of the first to third metal layers was 5 μm or more.

On the other hand, it may be appreciated that detects could occur at the time of processing vias in the board in the case in which the thickness of each of the first to third metal layers was less than 5 μm.

The following Table 4 shows results regarding the occurrences of a delamination defect in an adhesion surface and cracks, depending on the surface roughnesses of the first to third external electrodes and the exposed surface of the ceramic body. The degree of surface roughness of each of the first to third external electrodes was adjusted using a chemical method using an etchant, and the surface roughness of the exposed surface of the ceramic body was adjusted by a sand blasting method. An experimental example of Table 4 was performed under a condition in which the thickness of each of the first to third external electrodes was 20 μm, the intervals between the first to third external electrodes were 200 μm, and the band width of each of the first to third external electrodes was 300 μm.

TABLE 4

| Surface Roughness (nm) of External Electrode | Surface Roughness (nm) of Exposed Surface of Ceramic Body | Crack Defect | Delamination Defect |
|---|---|---|---|
| 100 | 100 | ○ | X |
| 100 | 150 | ○ | X |
| 100 | 200 | ○ | X |
| 100 | 250 | ○ | X |
| 100 | 500 | ○ | Δ |
| 100 | 1000 | ○ | Δ |
| 100 | 2000 | ○ | X |
| 100 | 3000 | Δ | X |
| 150 | 100 | ○ | X |
| 150 | 150 | ○ | X |
| 150 | 200 | ○ | Δ |
| 150 | 250 | ○ | Δ |
| 150 | 500 | ○ | Δ |
| 150 | 1000 | ○ | Δ |
| 150 | 2000 | ○ | Δ |
| 150 | 3000 | Δ | Δ |
| 200 | 100 | ○ | X |
| 200 | 150 | ○ | Δ |
| 200 | 200 | ○ | ○ |
| 200 | 250 | ○ | ○ |
| 200 | 500 | ○ | ○ |
| 200 | 1000 | ○ | ○ |
| 200 | 2000 | ○ | ○ |
| 200 | 3000 | Δ | ○ |
| 250 | 100 | ○ | X |
| 250 | 150 | ○ | Δ |
| 250 | 200 | ○ | ○ |
| 250 | 250 | ○ | ○ |
| 250 | 500 | ○ | ○ |
| 250 | 1000 | ○ | ○ |
| 250 | 2000 | ○ | ○ |
| 250 | 3000 | Δ | ○ |
| 1000 | 100 | ○ | X |
| 1000 | 150 | ○ | Δ |
| 1000 | 200 | ○ | ○ |
| 1000 | 250 | ○ | ○ |
| 1000 | 500 | ○ | ○ |
| 1000 | 1000 | ○ | ○ |
| 1000 | 2000 | ○ | ○ |
| 1000 | 3000 | Δ | ○ |
| 3000 | 100 | ○ | X |
| 3000 | 150 | ○ | Δ |
| 3000 | 200 | ○ | ○ |
| 3000 | 250 | ○ | ○ |
| 3000 | 500 | ○ | ○ |
| 3000 | 1000 | ○ | ○ |
| 3000 | 2000 | ○ | ○ |
| 3000 | 3000 | Δ | ○ |
| 5000 | 100 | ○ | X |
| 5000 | 150 | ○ | Δ |
| 5000 | 200 | ○ | ○ |
| 5000 | 250 | ○ | ○ |
| 5000 | 500 | ○ | ○ |
| 5000 | 1000 | ○ | ○ |
| 5000 | 2000 | ○ | ○ |
| 5000 | 3000 | Δ | ○ |
| 6000 | 100 | Δ | X |
| 6000 | 150 | Δ | X |
| 6000 | 200 | Δ | X |
| 6000 | 250 | Δ | Δ |
| 6000 | 500 | Δ | Δ |
| 6000 | 1000 | Δ | Δ |
| 6000 | 2000 | Δ | X |
| 6000 | 3000 | X | X |

○: defect rate less than 0.01%
Δ: defect rate equal to or ore than 0.01 and less than 10%
X: defect rate of 10% or more Referring to Table 4 above, it may be appreciated that an occurrence frequency of delamination defects in an adhesion surface was high in the case in which the surface roughness of each of the first to third external electrodes was less than 200 nm and the surface roughness of the exposed surface of the ceramic body is less than 200 nm, while an occurrence frequency of delamination defects in an adhesion surface is low in the case in which the surface roughness of each of the first to third external electrodes is 200 nm or more and the surface roughness of the exposed surface of the ceramic body is 200 nm or more, such that a multilayer ceramic capacitor having excellent reliability could be implemented.

On the other hand, it may be appreciated that the occurrence frequency of delamination defects in the adhesion surface between the multilayer ceramic capacitor and the insulating part is increased in the case in which the surface roughness of each of the first to third external electrodes and the surface roughness of the exposed surface of the ceramic body are respectively less than 200 nm, such that reliability of the multilayer ceramic capacitor was defective.

In addition, it may be appreciated that the occurrence frequency of delamination defects in the adhesion surface tended to increase in the case in which the surface roughness of the external electrode exceeded 5 μm and an occurrence frequency of cracks is increased in the case in which the surface roughness of the external electrode exceeds 2 μm.

As set forth above, according to exemplary embodiments of the present disclosure, a multilayer ceramic electronic component having reduced equivalent series inductance (ESL) may be provided.

In addition, according to exemplary embodiments of the present disclosure, a defect occurring in processing vias for electrically connecting the board circuit and the multilayer ceramic electronic component to each other may be solved.

Further, according to exemplary embodiments of the present disclosure, the surface roughness of the multilayer ceramic electronic component is adjusted, whereby a delamination phenomenon between the multilayer ceramic electronic component and the board may be decreased.

While exemplary embodiments have been shown and described above, it will be apparent to those skilled in the art that modifications and variations could be made without departing from the spirit and scope of the present disclosure as defined by the appended claims.

What is claimed is:

1. A multilayer ceramic electronic component embedded in a board, comprising:
   a ceramic body including a dielectric layer and having first and second surfaces opposing each other in a thickness direction, third and fourth surfaces opposing each other in a width direction, and fifth and sixth surfaces opposing each other in a length direction,
   a first external electrode extending from the fifth surface onto the first, second, third and fourth surfaces;
   a second external electrode extending from the sixth surface onto the first, second, third and fourth surfaces;
   a third external electrode disposed on the ceramic body between the first external electrode and the second external electrode to be spaced apart from the first and second external electrodes by predetermined intervals;
   a first internal electrode disposed on the dielectric layer within the ceramic body and connected to the first and second external electrodes; and
   a second internal electrode disposed to face the first internal electrode and connected to the third external electrode, the dielectric layer being interposed between the first and second internal electrodes,
   wherein $5 \leq G/te \leq 46$ is satisfied, where te is a thickness of the first to third external electrodes disposed on the first, second, third, and fourth surfaces, respectively, and G is an interval between adjacent external electrodes among the first to third external electrodes.

2. The multilayer ceramic electronic component of claim 1, wherein the first internal electrode comprises a first lead-out portion led-out to the fifth surface and a second lead-out portion led-out to the sixth surface.

3. The multilayer ceramic electronic component of claim 1, wherein the first internal electrode comprises a first lead-out portion led-out to at least one of the third and fourth surfaces and the fifth surface, and a second lead-out portion led-out to at least one of the third and fourth surfaces and the sixth surface.

4. The multilayer ceramic electronic component of claim 1, wherein the second internal electrode includes one or more of a third lead-out portion led-out to the third surface and a fourth lead-out portion led-out to the fourth surface.

5. The multilayer ceramic electronic component of claim 1, wherein lengths of the first and second external electrodes extending on the first surface are 280 μm to 380 μm.

6. The multilayer ceramic electronic component of claim 1, wherein a width of the third external electrode extending on the first surface is 280 μm to 380 μm.

7. The multilayer ceramic electronic component of claim 1, wherein the interval G between the adjacent external electrodes among the first to third external electrodes is 80 μm or more.

8. The multilayer ceramic electronic component of claim 1, wherein each of the first to third external electrodes includes a copper (Cu) metal layer which is an outermost layer thereof.

9. The multilayer ceramic electronic component of claim 8, wherein the copper (Cu) metal layer has a thickness of 5 μm or more.

10. The multilayer ceramic electronic component of claim 1, wherein a degree of surface roughness of each of the first to third external electrodes is 200 nm or more to 5000 nm or less.

11. The multilayer ceramic electronic component of claim 1, wherein a degree of surface roughness of the ceramic body is 200 nm or more to 2000 nm or less.

12. The multilayer ceramic electronic component of claim 1, wherein the third external electrode is a single integral external electrode wound around the first through fourth surfaces of the ceramic body to encompass the ceramic body in a band shape.

13. The multilayer ceramic electronic component of claim 1, wherein b/a is 0.64 or more, where a is an overall area of the first and second surfaces and the third and fourth surfaces of the ceramic body and b is an area of the first to third external electrodes formed on the first and second surfaces and the third and fourth surfaces of the ceramic body.

14. The multilayer ceramic electronic component of claim 1, wherein a length of the ceramic body is 1300 μm or less.

15. A printed circuit board having a multilayer ceramic electronic component, comprising:
   an insulating substrate; and
   the multilayer ceramic electronic component including a ceramic body including a dielectric layer and having first and second surfaces opposing each other in a thickness direction, third and fourth surfaces opposing each other in a width direction, and fifth and sixth surfaces opposing each other in a length direction, a first external electrode extending from the fifth surface onto the first to fourth surfaces, a second external electrode extending from the sixth surface onto the first to fourth surfaces, a third external electrode disposed on the ceramic body between the first and second external electrodes to be spaced apart from the first and second external electrodes by predetermined intervals, a first internal electrode disposed on the dielectric layer within the ceramic body and connected to the first and second external electrodes, and a second internal electrode disposed to face the first internal electrode and connected to the third external electrode, the dielectric layer being interposed between the first and second internal electrodes,
   wherein $5 \leq G/te \leq 46$ is satisfied, where te is a thickness of the first to third external electrodes disposed on the first and second surfaces and the third and fourth surfaces and G is an interval between adjacent external electrodes among the first to third external electrodes.

16. The printed circuit board of claim 15, wherein a length of at least one of the first and second external electrodes extending to the first surface in the length direction is 280 μm to 380 μm.

17. The printed circuit board of claim 15, wherein a width of the third external electrode extending on the first surface is 280 μm to 380 μm.

18. The printed circuit board of claim 15, wherein the interval G between adjacent external electrodes among the first to third external electrodes is 80 μm or more.

19. The printed circuit board of claim 15, wherein the first to third external electrodes include copper (Cu) metal layers disposed on outermost layers thereof, respectively, and at least one of the copper (Cu) metal layers has a thickness of 5 μm or more.

20. The printed circuit board of claim 15, wherein a surface roughness of each of the first to third external electrodes is 200 nm or more to 5000 nm or less.

21. The printed circuit board of claim 15, wherein a surface roughness of the ceramic body is 200 nm or more to 2000 nm or less.

22. The printed circuit board of claim 15, wherein a length of the ceramic body is 1300 μm or less.

23. A multilayer ceramic electronic component embedded in a board, comprising:

a ceramic body including a dielectric layer;

first and second external electrodes disposed on two end surfaces of the ceramic body;

a third external electrode disposed on the ceramic body between the first and second external electrodes to be spaced apart from the first and second external electrodes;

a first internal electrode disposed on the dielectric layer within the ceramic body and connected to the first and second external electrodes;

a second internal electrode disposed to face the first internal electrode within the ceramic body and connected to the third external electrode, the dielectric layer being interposed between the first and second internal electrodes; and copper (Cu) metal layers disposed on outermost surfaces of the first to third external electrodes, respectively, wherein b/a is 0.64 or more, where a is an overall area of the first and second surfaces and the third and fourth surfaces of the ceramic body and b is an area of the first to third external electrodes formed on the first and second surfaces and the third and fourth surfaces of the ceramic body.

24. A printed circuit board having a multilayer ceramic electronic component, comprising:

an insulating substrate; and the multilayer ceramic electronic component including a ceramic body including a dielectric layer, first and second external electrodes disposed on two end surfaces of the ceramic body, a third external electrode disposed on the ceramic body between the first and second external electrodes to be spaced apart from the first and second external electrodes by predetermined intervals, a first internal electrode disposed on the dielectric layer within the ceramic body and connected to the first and second external electrodes, a second internal electrode disposed to face the first internal electrode and connected to the third external electrode, the dielectric layer being interposed between the first and second internal electrodes, and copper (Cu) metal layers disposed on outermost surfaces of the first to third external electrodes, respectively, wherein b/a is 0.64 or more, where a is an overall area of the first and second surfaces and the third and fourth surfaces of the ceramic body and b is an area of the first to third external electrodes formed on the first and second surfaces and the third and fourth surfaces of the ceramic body, wherein the multilayer ceramic electronic component is embedded in the insulating substrate.

25. The printed circuit board of claim 15, wherein the first internal electrode comprises a first lead-out portion led-out to each of the third through fifth surfaces, and a second lead-out portion led-out to each of the third and fourth surfaces and the sixth surface.

26. The multilayer ceramic electronic component of claim 1, wherein the first internal electrode comprises a first lead-out portion led-out to each of the third through fifth surfaces, and a second lead-out portion led-out to each of the third and fourth surfaces and the sixth surface.

* * * * *